United States Patent
Hess et al.

(10) Patent No.: US 9,651,148 B2
(45) Date of Patent: May 16, 2017

(54) METHOD FOR IMPROVEMENT OF THE SHIFTING QUALITY AT THE START OF THE INITIAL OPERATION OF A NEW AUTOMATIC GEARBOX OR AN AUTOMATIZED GEARBOX OF A MOTOR VEHICLE

(71) Applicant: ZF Friedrichshafen AG, Friedrichshafen (DE)

(72) Inventors: Christoph Hess, Eriskirch (DE); Philipp Koelbl, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 31 days.

(21) Appl. No.: 14/608,349

(22) Filed: Jan. 29, 2015

(65) Prior Publication Data
US 2015/0211630 A1    Jul. 30, 2015

(30) Foreign Application Priority Data

Jan. 30, 2014    (DE) .................... 10 2014 201 603

(51) Int. Cl.
*F16H 61/18*    (2006.01)
*F16H 61/06*    (2006.01)

(52) U.S. Cl.
CPC .......... *F16H 61/18* (2013.01); *F16H 61/061* (2013.01); *F16H 2061/064* (2013.01)

(58) Field of Classification Search
CPC ............................................... F16H 2061/064
See application file for complete search history.

(56) References Cited

U.S. PATENT DOCUMENTS

| | | | |
|---|---|---|---|
| 4,989,471 A * | 2/1991 | Bulgrien | B60W 10/02 477/57 |
| 5,626,534 A * | 5/1997 | Ashley | B60W 10/02 477/79 |
| 6,569,060 B2 | 5/2003 | Rosi et al. | |
| 7,069,767 B2 * | 7/2006 | Runde | F16H 61/061 702/105 |
| 7,590,480 B2 * | 9/2009 | Dlugoss | F16H 61/061 701/51 |

FOREIGN PATENT DOCUMENTS

DE    10 2004 007 080 A1    11/2005

OTHER PUBLICATIONS

German Patent Office Search Report, Sep. 26, 2014.

* cited by examiner

*Primary Examiner* — Ramya Burgess
*Assistant Examiner* — David Morris
(74) *Attorney, Agent, or Firm* — Dority & Manning, P.A.

(57) ABSTRACT

Within of the method for improving the shifting quality at the start of the commissioning of a new automatic transmission or an automated transmission of a motor vehicle, a filling pressure adaptation is carried out by individual gearshifts. At least one adaptation counter is monitored, which indicates the number of the carried out filling pressure adaptations of at least one shifting element with one individual gearshift from the commissioning of the new automatic transmission or automated transmission. As long as the value of a specified number of monitored adaptation counters falls below a specified threshold value, no D-R and R-D reversing operations are permitted by the transmission control.

4 Claims, 1 Drawing Sheet

Fig. 1A
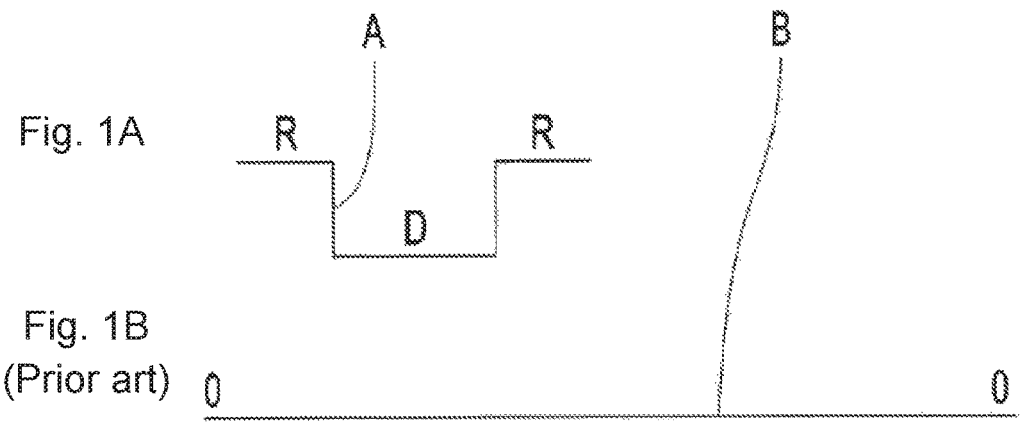
Fig. 1B
(Prior art)
Fig. 1C
(Prior art)
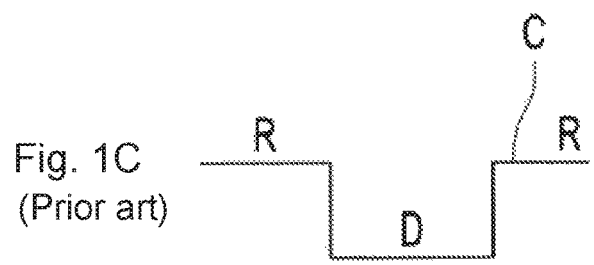
Fig. 1D
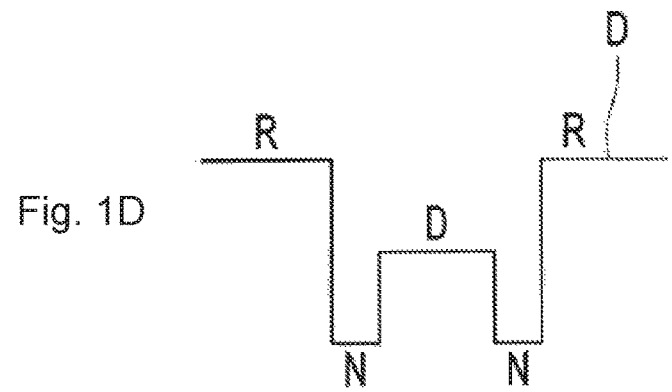
Fig. 1E
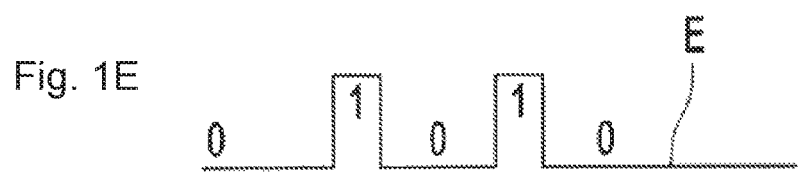

METHOD FOR IMPROVEMENT OF THE SHIFTING QUALITY AT THE START OF THE INITIAL OPERATION OF A NEW AUTOMATIC GEARBOX OR AN AUTOMATIZED GEARBOX OF A MOTOR VEHICLE

FIELD OF THE INVENTION

The invention relates to a method for improving the shifting quality at the start of the commissioning of a new automatic transmission or an automated transmission of a motor vehicle.

BACKGROUND

From the state of the art, it is known to, for automatic transmissions of motor vehicles, in particular for multi-ratio transmissions, adapt the filling pressure of a shifting element to be shifted on the basis of the evaluation of rotational speed signals during the activation of a gear stage (i.e., during the engagement of the gear), in order to increase shifting comfort and the shifting quality over the service life of the transmission. Through the filling pressure adaptation, unwanted deviations in the shifting process, which arise, for example, due to component tolerances for cost and manufacturing reasons, from changes to the coefficient of friction of multi-disks and mechanical wear in the transmission are taken into account and compensated.

For new transmissions, according to the state of the art, individual gearshifts are taken into account for the purpose of adaptation, in order to achieve a clear allocation and thus a reliable adaptation.

However, if new vehicles comprising an automatic transmission or an automated transmission are moved or maneuvered at the end of the assembly line or prior to delivery to the customer, the operation of the reverse is often performed. Thereby, a change in the driving position from the driving position D to R or in reverse, without an interim gearshift of the P or N position, is carried out. Thereby, in a disadvantageous manner, the filling pressure adaptation operations of the shifting elements, which are of high importance for new transmissions, are prevented or impaired.

This means that the gear engagement operations at the start of the commissioning of a new automatic transmission or an automated transmission are not evaluated or not subject to a filling pressure adaptation, which leads to the fact that shifting quality is improved only after delivery to the end customer, and not at the factory or at the dealer.

SUMMARY OF THE INVENTION

The present invention is subject to a task of specifying a method for improving the shifting quality at the start of the commissioning of a new automatic transmission or an automated transmission of a motor vehicle. This is to ensure that, for each gearshift, a filling pressure adaptation of the shifting elements is carried out at the start of the commissioning of a new automatic transmission or an automated transmission. Additional objects and advantages of the invention will be set forth in part in the following description, or may be obvious from the description, or may be learned through practice of the invention.

The tasks are solved by the characteristics described and claimed herein.

Accordingly, a method for improving the shifting quality at the start of the commissioning of a new automatic transmission or an automated transmission of a motor vehicle is proposed, within the framework of which a filling pressure adaptation is carried out by individual gearshifts, whereas at least one adaptation counter is monitored, which indicates the number of the carried out filling pressure adaptations of at least one shifting element with one individual gearshift from the commissioning of the new automatic transmission or automated transmission, whereas, as long as the value of a specified number of monitored adaptation counters falls below a specified threshold value, no D-R and R-D reversing operations are permitted by the transmission control.

The D-R and R-D reversing operations are separated into individual gear disengagement and gear engagement operations, each of which is subject to a filling pressure adaptation of the participating shifting elements. Thereby, the threshold values allocated to the adaptation counters may be equal, or each may take a specified value.

Within the framework of one variant of the method in accordance with the invention, no D-R and R-D reversing operations are permitted by the transmission control as long as the value of all monitored adaptation counters falls below the relevant threshold value.

In accordance with an additional form of the invention, it can be provided that no D-R and R-D reversing operations are permitted by the transmission control if other filling pressure adaptation operations, based on external parameters, lead to inappropriate results, for example if the road condition is poor.

BRIEF DESCRIPTION OF THE DRAWINGS

In the following, the invention is more specifically illustrated as an example on the basis of the attached FIGS. 1A through 1E, which represent the chronological course of the gear selector position and the corresponding chronological course of the filling pressure adaptation and the actually carried out gearshift according to the state of the art and in accordance with the invention.

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

In the accompanying FIG. 1A, curve A represents the chronological course of the gear selector position for a targeted reversing operation for a vehicle comprising an automatic transmission, whereas curve B of FIG. 1B represents the course of the filling pressure adaptation of the participating shifting elements according to the state of the art as a function of time, and curve C of FIG. 1C represents the actual chronological process of the gearshift according to the state of the art. In addition, curve D of FIG. 1D represents the actual chronological process of the gearshift for a targeted reverse operation in accordance with the invention, whereas curve E of FIG. 1E represents the course of the filling pressure adaptation of the participating shifting elements for a targeted reverse operation in accordance with the method in accordance with the invention as a function of time.

According to the state of the art, if a reversing operation is started through a gear selector, which is illustrated by curve A, this is carried out by the transmission control in accordance with curve C, if certain parameters (for example, the current vehicle speed) permit it. This leads to the fact that the adaptation of the participating shifting elements to be carried out cannot be carried out, since, at the start of the commissioning of a new automatic transmission, only individual gearshifts are taken into account for the purpose of the adaptation, in order to obtain a clear allocation and thus a reliable adaptation. This is illustrated by curve B, which takes the value 0 (no adaptation) during the reversing operation.

In accordance with the invention, and with reference to the attached figures, at least one adaptation counter is monitored, which indicates the number of the carried out filling pressure adaptations of at least one shifting element with one individual gearshift from the commissioning of the new automatic transmission or automated transmission. It is thereby provided that, as long as the value of a specified number of monitored adaptation counters falls below a threshold value, no D-R and R-D reversing operations are permitted by the transmission control.

In accordance with the invention, and as illustrated by curve D, upon such an event, the D-R and R-D reversing operations are separated into individual gear disengagement and gear engagement operations, each of which is subject to a filling pressure adaptation of the participating shifting elements, which is illustrated by curve E.

Through the concept in accordance with the invention, it is ensured that, at the start of the commissioning of a new automatic transmission or an automated transmission of a motor vehicle, a filling pressure adaptation of the shifting elements is carried out for each gearshift.

Modifications and variations can be made to the embodiments illustrated or described herein without departing from the scope and spirit of the invention as set forth in the appended claims.

The invention claimed is:

1. A method for improving shifting quality at start of commissioning of a new automatic or automated transmission of a motor vehicle, comprising:
    conducting a filling pressure adaptation of individual gearshifts;
    monitoring at least one counter of the filling pressure adaptations of at least one of the individual gearshifts, the at least one counter indicating a number of filling pressure adaptations of at least one shifting element of the at least one of the individual gearshifts since commissioning of the transmission; and
    so long as the number of filling pressure adaptations counted by the counter for the at least one shifting element falls below a specified threshold value, Drive-Reverse (D-R) and Reverse-Drive (R-D) gearshifts without an interim gearshift into neutral are not permitted.

2. The method as in claim 1, wherein so long as the number of filing pressure adaptations counted by the counter falls below the specified threshold value, the D-R and R-D gearshifts with the interim gearshift are separated into individual gear disengagement and subsequent gear engagement sequences wherein the shifting elements are subject to filling pressure adaptations.

3. The method as in claim 1, wherein multiple of the at least one counter are monitored for filling pressure adaptations of the at least one shifting element of different individual gearshifts, the threshold value being the same or different for each of the multiple of the at least one counter.

4. The method as in claim 3, wherein no Drive-Reverse (D-R)and Reverse-Drive (R-D) gearshifts without the interim gearshift are permitted so long as each of the multiple of the at least one counter falls below its respective threshold value.

* * * * *